(12) United States Patent
Clauter et al.

(10) Patent No.: US 10,508,208 B2
(45) Date of Patent: Dec. 17, 2019

(54) PROCESS FOR PRINTING MULTICOLOURED PRINTED IMAGES

(71) Applicant: Merck Patent GmbH, Darmstadt (DE)

(72) Inventors: Peter Clauter, Pfungstadt (DE); Cairon Platzer, Darmstadt (DE); Kirsten Fritsche, Darmstadt (DE); Marc-Dieter Weingart, Grenchen (CH); Lorenz Boegli, Muentschemier (CH); Christoph Schmidt, Kriftel (DE)

(73) Assignee: Merck Patent GmbH, Darmstadt (DE)

(*) Notice: Subject to any disclaimer, the term of this patent is extended or adjusted under 35 U.S.C. 154(b) by 148 days.

(21) Appl. No.: 15/548,783

(22) PCT Filed: Jan. 25, 2016

(86) PCT No.: PCT/EP2016/000120
§ 371 (c)(1),
(2) Date: Aug. 4, 2017

(87) PCT Pub. No.: WO2016/124315
PCT Pub. Date: Aug. 11, 2016

(65) Prior Publication Data
US 2018/0016452 A1 Jan. 18, 2018

(30) Foreign Application Priority Data

Feb. 6, 2015 (EP) .................................... 15000343
Dec. 18, 2015 (EP) .................................... 15201374

(51) Int. Cl.
*B41J 2/21* (2006.01)
*B41M 3/00* (2006.01)
(Continued)

(52) U.S. Cl.
CPC ........... *C09D 11/037* (2013.01); *B41J 2/2107* (2013.01); *B41M 3/14* (2013.01); *C09D 11/322* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 2006/0082844 A1* | 4/2006 | White | H04N 1/54 |
| | | | 358/504 |
| 2010/0129411 A1* | 5/2010 | Schmidt | A61K 8/11 |
| | | | 424/401 |
| 2013/0118380 A1* | 5/2013 | Roesler | C09D 7/70 |
| | | | 106/442 |

FOREIGN PATENT DOCUMENTS

| DE | 102005037095 A1 | 2/2007 |
| EP | 1985458 A1 | 10/2008 |

OTHER PUBLICATIONS

Armanini L: "Producing Three-Color Effects Form Interference Pigments", Plastics Engineering, Society of Plastics Engineers,Inc. Greenwich, Conn, US, vol. 50, No. 12, Dec. 1, 1994 (Dec. 1, 1994), pp. 31/32,33, XP000521245, ISSN: 0091-9578.
(Continued)

*Primary Examiner* — Manish S Shah
(74) *Attorney, Agent, or Firm* — Millen White Zelano and Branigan, PC; John Sopp (57) ABSTRACT

The present invention relates to a process for printing multicoloured printed images in which exclusively interference pigments are used for the coloured pigmentation of the
(Continued)

printing inks, to printed products produced using a process of this type, to the use thereof, and to suitable interference pigments.

20 Claims, 1 Drawing Sheet

(51) Int. Cl.
    *B41M 5/00*        (2006.01)
    *C09D 11/037*    (2014.01)
    *C09D 11/322*    (2014.01)
    *C09D 11/40*     (2014.01)
    *B41M 3/14*      (2006.01)
    *H04N 1/00*      (2006.01)

(52) U.S. Cl.
    CPC ............. *C09D 11/40* (2013.01); *B41M 3/008* (2013.01); *B41M 5/0023* (2013.01); *H04N 1/00* (2013.01)

(58) Field of Classification Search
    CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

OTHER PUBLICATIONS

International Search Report from WO2016124315A1 dated Apr. 5, 2016.
English machine translation of EP1985458A1 published Oct. 29, 2008 to Perron Maurice of Banque De France.

* cited by examiner

PROCESS FOR PRINTING MULTICOLOURED PRINTED IMAGES

The present invention relates to a process for printing multicoloured printed images, in particular multicoloured printed images in photorealistic quality, in which exclusively interference pigments are used for the coloured pigmentation of the printing inks, to printed images produced by means of a process of this type, and to the use thereof, and to interference pigments and printing inks comprising same with which the process can be carried out.

In conventional printing processes, such as offset printing, gravure printing or screen printing, multicoloured printed images are printed on generally white or pale print material by means of print dots or print areas of the primary colours cyan, magenta, yellow and optionally also black (CMYK) which are usual for analogue printing processes, alongside one another or one on top of the other. Each of the printing inks is pigmented with classical absorption colours which mix subtractively in visual perception. Many desired hues of the colour circle can thus be produced from suitable combinations of the primary colours. If, however, equivalent amounts of cyan-, magenta- and yellow-pigmented printing inks are applied one on top of the other to a single area unit, the colour black is perceived by the observer. In addition, black areas or text are additionally intensified in practical print application by means of black-pigmented printing ink. Modern digital processes, such as ink-jet printing or toner-based electrophotography, are also based on the proven CMYK system, since printing-out of the images is still reliant on the presence of absorption pigments or dyes in the printing inks, although the digital recordings are themselves not saved in the CMYK system, but instead in RGB mode.

Digital displays of screens of a very wide variety of types (LCD, LED, OLED, plasma) use light rays in the primary colours red, green and blue, which are combined with one another in various combinations to give light dots which can assume any desired position in the colour circle. In contrast to the CMYK colour system, coloured light rays in RGB mode mix additively, i.e. superimposed RGB light rays of adequate intensity mix to give the visual perception of white. Digital recordings from still or movie cameras are likewise made in RGB mode, so that playback of these recordings on digital displays is possible without major adaptation problems, while the printing-out of digital recordings in conventional printers, for example in ink-jet printers, requires computer-aided conversion of image data obtained in RGB mode into data for a mechanically printable image in the CMYK system.

Besides the use of absorption pigments or dyes, interference pigments having various optical properties (pure interference colours, interference colours combined with absorption colours, lustre and glitter effects, optically variable effects) have in recent years additionally also been employed more frequently in CMYK-aided printing processes, which have been used in order to emphasise details, achieve particular additional lustre or glitter or overall for optical improvement of the overall impression of the printed products. Such printed products often attract particular attention from the observer owing to their particular effects, but are not favourable in production owing to the combined use of absorption pigments and interference pigments and the associated different technical requirements of the printing apparatuses and processes. In addition, it is becoming more and more difficult to find interference pigments which are able to achieve the very particular effects which also attract attention in expert circles.

The optical effect of interference pigments is based on the difference in the refractive index of materials which are arranged one on top of the other in the pigments in the form of thin layers and reflect, transmit and possibly also absorb incident light differently depending on the refractive index of the respective layer and of the medium surrounding the interference pigment. Refractive index differences between adjacent layers cause path differences in the reflected light rays, so that they interfere with one another and light of certain wavelengths is amplified or weakened wavelength-selectively. The reflected light rays in the visible wavelength region amplified in this way are perceived by the observer as a visible interference colour under suitable conditions. If all layers of the interference pigments are composed of transparent, colourless materials, only interference colours, but no mass tones, of the interference pigments are perceptible.

Optically, the interference colours of interference pigments which do not have absorption colours act like coloured light rays, i.e. combine additively with one another. Thus, a loose bed of transparent interference pigments which are colourless as individual pigments which is present in a suitable mixing ratio of red, blue and green interference pigments (i.e. interference pigments which exhibit a red, green or blue interference colour in the application medium) should theoretically give rise to a visually perceptible white overall impression, but in practice frequently differs from this, so that a whitish, pale-grey hue is perceived.

Individual interference pigments generally consist of a flake-form support material and one or more more or less transparent layers, with which the flake-form supports are coated. However, the uniform layer thickness of the support and of the individual layers, the homogeneity of the composition of the individual layers and the surface nature of support and individual layers as well as the size and size distribution of the pigments determine, inter alia, the extent to which the optical behaviour of the respective interference pigments differs from the ideal behaviour of the materials currently employed. The preparation conditions of interference pigments thus have a major influence on their optical behaviour. This also explains the large differences in the optical behaviour, expressed by, for example, saturation, lightness or colour angle, of interference pigments which formally have the same hue (for example red) and formally have the same layer structure (for example titanium dioxide layer on mica flakes) depending on the manufacturer and the preparation process employed, indeed even depending on the respective batch.

It has therefore not yet been possible to date in practice to develop analogue printing processes which allow the production of saturated, multicoloured printed images whose colouration is based exclusively on the optical effect of pure interference colours generated by interference pigments.

US 2006/0082844 A1 discloses a theoretical concept with the aid of which interference pigments are intended to be suitable for use for the printing of multicoloured printed images. This concept, called R'G'B'Y', is based on the use of four printing inks which respectively comprise red, green, blue and yellow (golden) interference pigments, with four so-called bytes being necessary in order to generate one print dot (pixel). This concept is based on the knowledge or assumption that red and green interference pigments, in contrast to red and green light, do not mix to give yellow, but instead grey. In order to obtain a yellow colour of the pixel, a separate yellow or golden colour track therefore has to be produced in this concept. It also arises from this that the generation of a white colour impression requires a red, green, blue and yellow printing ink which is pigmented with interference pigments of the respective interference colour. However, the concept described here remains theoretical. Thus, no practically usable information is given on the interference pigments to be employed, nor does the disclosure enable conclusions to be drawn on print modalities which would enable practical implementation of this concept.

The object of the invention is to provide a practically implementable printing process with the aid of which attractive, multicoloured printed images can be produced on variable substrates, where the printing inks are colour-pigmented with interference pigments and where a printed image which has hues throughout the entire colour space can be produced using the smallest possible number of different printing inks, and where the printing process can be adapted in a variable manner to the usual analogue and digital printing processes.

A further object of the invention consists in providing printed products which have multicoloured printed images in bright colours and with additional particular optical effects, and indicating the use thereof.

In addition, the object of the invention consists in providing specific interference pigments and printing inks comprising them, with the aid of which the said printing process can be carried out in the highest print quality.

The object of the present invention is achieved by a process for printing multicoloured printed images in RGB mode, in which three coloured printing inks are applied successively in the form of print area units to a substrate and solidified, and in which the printing inks each consist of a printing ink vehicle which is colour-pigmented exclusively with interference pigments and a printing ink in each case comprises red interference pigments, green interference pigments or blue interference pigments, and in which print area units lying alongside one another and/or one on top of the other which give rise to a multicoloured overall printed image are formed from the three coloured printing inks.

The object of the present invention is likewise achieved by printed products which have been produced by the process described above, and is achieved by the use thereof in decorative or artistic products.

In addition, the object of the invention is also achieved by a red interference pigment and a green interference pigment which each consist of a flake-form transparent substrate and a coating located on the substrate, where the coating in each case consists of at least 85% by weight, based on the weight of the layer, of titanium dioxide and/or titanium dioxide hydrate and where the red interference pigment has a hue angle $h_{u'v'}$ in the CIELUV colour space system in the range from 0° to 10° and the green interference pigment has a hue angle $h_{u'v'}$ in the range from 100° to 130°, in each case determined in a separate, full-area coating comprising the respective coloured printing ink on a black substrate under the measurement condition 45°/as 25°.

In addition, the object of the invention is achieved by a printing ink which consists of a printing ink vehicle which is colour-pigmented exclusively with red interference pigments, and by a printing ink which consists of a printing ink vehicle which is colour-pigmented exclusively with green interference pigments, where the red and green interference pigments are essentially the red and green interference pigment described above.

The printing process according to the invention is based on the RGB mode known per se, which, however, as described above, has to date only found practical application for the combination of light rays of different colours in displays or similar technical devices. However, the present inventors can provide, in a surprising manner, a printing process in which the consecutive printing of only three printing inks colour-pigmented exclusively with interference pigments is sufficient in order to be able to obtain multicoloured printed images having hues extending over the entire colour space.

It has been found that a process of this type is only possible if yellow print area units are obtained on a substrate by consecutive application of a printing ink which comprises red interference pigments and a printing ink which comprises green interference pigments to the same print area unit.

Red, green or blue printing inks below are taken to mean printing inks which are colour-pigmented exclusively with interference pigments which have respectively a red, green or blue interference colour. The presence of the interference colour is determined here, as is usual in the art, on the basis of the reflection of interference pigments in a transparent, colourless medium, generally a coating on a substrate.

In the present invention, all measurements are carried out on the samples described below using an MA 68/II multi-angle color spectrophotometer from X-Rite, Inc., USA. The interference colour of the interference pigments is determined here using the directed reflection at the sample and the spectrally resolved analysis of the reflected light. The measurement conditions for all data used in the present description are an illumination angle of 45° and an observation angle of as 25°.

In each case, the red interference pigments have an increased reflection in the wavelength range from 600 to 750 nm, the green interference pigments have an increased reflection in the wavelength range from 490 to 550 nm and the blue interference pigments have an increased reflection in the wavelength range from 400 to 490 nm. The more pronounced and narrower the corresponding reflection maximum comes out, the more clearly visually perceptible is a monochromatic and saturated interference colour.

If, in general, a red printing ink as defined above and a green printing ink as defined above are applied one on top of the other to the same area unit on a substrate, the corresponding area unit, depending on the concentration of the interference pigments in the printing ink and on the ratio of the respectively applied amount of printing ink per area unit, can have different mixed colours which extend from reddish green to greenish red and, at a certain mixing ratio and in the case of certain red or green tones, may also represent grey shades.

Figure 1:
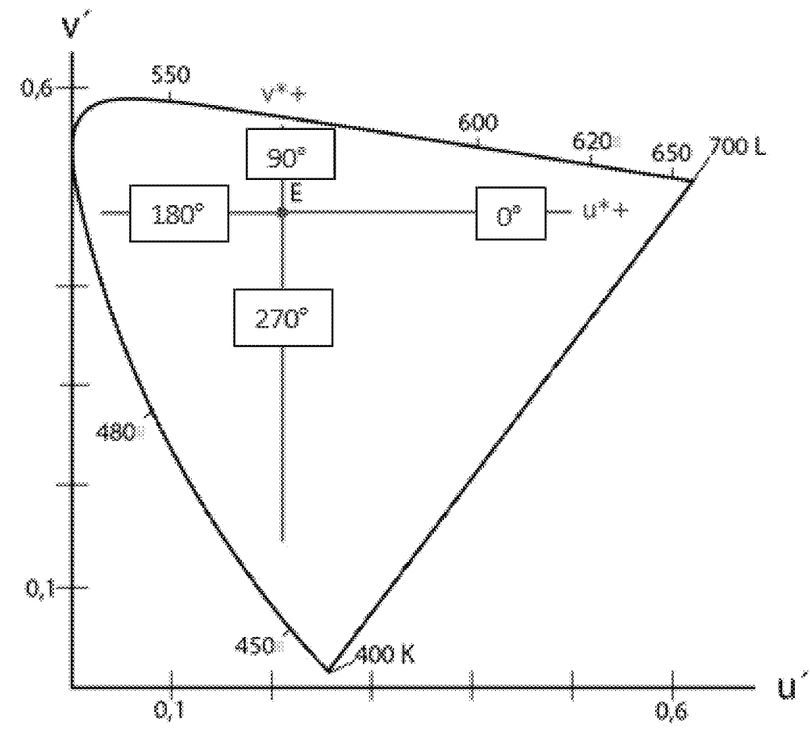
FIG. 1: shows the CIELUV colour space (1976) with the neutral or achromatic point E and the structure for determination of colour angles in this colour space The invention will be explained below with reference to examples, but is not intended to be restricted thereto.

The present inventors have found that a red printing ink and a green printing ink as defined above, printed successively on the same area unit, are able to produce a yellow hue if certain conditions are maintained for the red and green interference pigments present in the printing inks. Thus, it is necessary in accordance with the present invention that the red interference pigments in the red printing ink have a hue angle $h_{u'v'}$ in the CIELUV (1976) colour space system in the range from 0° to 25°, in particular from 1° to 20°, and the green interference pigments in the green printing ink have a hue angle $h_{u'v'}$ in the range from 100° to 180°, in particular from 110° to 150°, where the hue angle of the red interference pigments is not 0° if the hue angle of the green interference pigments is 180°, and vice versa (see FIG. 1; hue angle determined in an in each case separate, full-area coating comprising the respective coloured printing ink on a black substrate in the CIELUV(1976) colour space system at 45°/as 25°, more detailed description see below).

(For the meaning and determination of the hue angle, see: Richter, M., *Einführung in die Farbmetrik* [*Introduction to Colorimetry*], 2nd Edition, de Gruyter, 1981, pp. 118-122.)

The process according to the invention can be carried out particularly advantageously if the separation of the hue angle $h_{u'v'}$ of the red interference pigment from the hue angle $h_{u'v'}$ of the green interference pigment is 90 to 160 angle degrees (deg) and is preferably in the range from 105 to 140 angle degrees and in particular in the range from 110 to 130 angle degrees. This also applies in the same way to the respective separations of the hue angles between the green and the blue interference pigment and between the blue and the red interference pigment. This means that the separation of the hue angle $h_{u'v'}$ of the green interference pigment from the hue angle $h_{u'v'}$ of the blue interference pigment and the separation of the hue angle $h_{u'v'}$ of the blue interference pigment from the hue angle $h_{u'v'}$ of the red interference pigment should advantageously in each case be in the range from 90 to 160 angle degrees, preferably from 105 to 140 angle degrees and in particular in the range from 110 to 130 angle degrees.

While maintaining these conditions, in particular with respect to the red and green interference pigment, it is possible that an area unit on a substrate which is printed successively in an overlapping manner with a red printing ink and a green printing ink as defined above can, at certain quantitative ratios of the printing inks and with a defined pigment content, overall have a visually perceptible yellow hue. Each of the printed layers applied here can be solidified separately or the combination of a printed layer comprising red printing ink and a printed layer comprising green printing ink overlapping the first layer is solidified jointly.

The hue angle $h_{u'v'}$ of the blue interference pigments can be selected comparatively freely, but preferably complies with the above-mentioned ranges for the separations of the hue angles and is advantageously in the range from 210° to 280°.

The maintenance of the conditions described above, in particular for the red and green interference pigments, makes it possible for a printing process with only three printing inks which are colour-pigmented with interference pigments (RGB) to be sufficient in order to obtain multicoloured printed images in the coloured variety of the entire colour space. The colour intensity and the brightness of the printed images here naturally depends on further conditions.

An embodiment of the present invention in which the interference pigments employed in each case have the highest possible colour saturation, i.e. are particularly intensely coloured, is therefore advantageous in accordance with the invention.

In order to assess the colour saturation of interference pigments, the CIELUV colour space system (1976), which is normally employed for the measurement of light colours, is, in particular, overall suitable for the assessment of interference pigments, but is less widespread than the frequently used CIELAB colour space system. However, the colour values obtained using the usual measuring equipment can in each case be converted from one colour space system into the other (see: Wyszecki G., Stiles W. S., *Color Science, Concepts and methods, Quantitative Data and Formulae*, Wiley, 2000, pp. 158-169). The saturation $S^*_{u'v'}$ in the CIELUV colour space system describes the distance of the respective colour location from the achromatic point in the colour chart. This actual colour saturation of an interference pigment can be estimated significantly more realistically by means of the CIELUV colour values than by means of the chroma value determined in the CIELAB colour space system, since in the former the influence of the lightness is eliminated, whereas in the CIELAB system it is only possible to determine chroma values, which are composed of colour saturation and lightness.

The saturation and other application-related colour properties of interference pigments, in whatever colour space system, can only be determined in an application form, but not on the individual particle. For this reason, all colour data used in the present invention relate to a coating which consists of a commercially available liquid printing ink vehicle and the respective interference pigment in a concentration of 23% by weight, based on the finished coating composition, and is applied over the entire area to a black substrate by gravure printing and solidified.

(30 parts by weight of pigment and 70 parts by weight of gravure printing binder (for example. Siegwerk 5036 Verschnitt NC TOF) are mixed intimately, and the viscosity is adjusted to a printing-ready level before printing using 30 parts per weight of a mixture of ethanol/ethyl acetate (3:1). The printing ink, comprising the respective red, blue or green interference pigments, is subsequently in each case applied individually over the entire area to a black-coloured substrate (for example Fedrigoni SPX Black) using a gravure printing machine (60 L/cm, 120°, E engraving) and dried. The printed substrate obtained is divided into pieces of suitable size and measured optically, see below)

The colour data are measured using an MA 68/II multi-angle color spectrophotometer from X-Rite, Inc., USA. The spectral data obtained are used to calculate the respective colour coordinates L*u',v' for the CIELUV(1976) colour space system for given boundary conditions (2° or 10° standard observer and D65 light source).

It has proven particularly advantageous in accordance with the invention for the interference pigments employed in the printing inks to have the following saturation values in an in each case separate, full-area coating comprising the respective coloured printing ink on a black substrate in the CIELUV colour space system:

Red interference pigments $S^*_{u'v'} \geq 0.6$
Blue interference pigments $S^*_{u'v'} \geq 1.2$ and
Green interference pigments $S^*_{u'v'} \geq 0.4$
at 45°/as 25°. 45° here represents the illumination angle and as 25° represents the observation angle at a separation from the specular angle. Since the respective saturation values have natural upper limits, inter alia due to the natural limitation of the CIELUV colour space, quoting of the maximum values for the saturation is not appropriate here, instead all interference pigments having a red, blue or green interference colour whose CIELUV saturation values correspond atleast to the lower limits indicated above are suitable.

In addition, however, the chroma of the interference pigments employed in each case also plays an important role in the case of high-quality printed products having an intense colouration. Thus, for qualitative success of the printing process according to the invention, it is particularly advantageous for the interference pigments employed in the printing inks to have the following chroma values in an in each case separate, full-area coating comprising the respective coloured printing ink on a black substrate in the CIELUV colour space system:

Red interference pigments $C^*_{u'v'} \geq 30$
Blue interference pigments $C^*_{u'v'} \geq 50$ and
Green interference pigments $C^*_{u'v'} \geq 25$
at 45°/as 25°. 45° here represents the illumination angle and as 25° represents the observation angle at a separation from the specular angle. The respective chroma values are likewise not subject to any upper restriction. Instead, it is possible to employ all red, blue and green interference pigments whose chroma has at least the values indicated above and can otherwise have any value up to the highest achievable value for interference pigments.

The chroma value in the CIELUV(1976) colour space system arises from the product of lightness L* and saturation $S^*_{u'v'}$.

$$C^*_{u'v'} = L^* S^*_{u'v'}$$

The interference pigments employed for the printing process according to the invention exhibit either a red or a blue or a green interference colour in the application medium. They consist of flake-form supports which have been coated with one or more layers of materials which have a different refractive index from the support material, which applies at least to the material of the first layer located on the support, and, if a plurality of layers are present on the support, have refractive indices which are different from one another between layers lying directly on one another.

Many interference pigments which satisfy these conditions are known on the market and in the specialist literature. Besides interference effects, many of these known interference pigments also exhibit absorption effects due to the material composition of their support or their layers located on the support. This applies, for example, to interference pigments whose support consists of metals, of graphite or flake-form iron oxide, but also applies to all interference pigments whose layer structure comprises absorbent materials, such as iron oxides, chromium oxide or cobaltoxide, or mixed oxides, such as pseudobrookite. These interference pigments often exhibit interference colours which are perceived as very intense, but are only suitable for use in the process according to the invention on the condition that the interference pigments are at least semitransparent and that the aim is to produce printed images which have specific "colour casts" in the inherent absorption colours of the interference pigments and which differ in their optical appearance from printed images which achieve photorealistic optical effects.

In order to be able to obtain the said photorealistic optical effects in the resultant printed image, it is therefore necessary and preferred in accordance with the invention for the red, blue and green interference pigments in each case to consist of transparent, colourless, flake-form supports which have been coated with one or more layers of transparent, colourless materials.

The interference pigments themselves are also in flake form.

Pigments or support materials are referred to as flake form if their outer shape corresponds to a flat structure which, with its upper and lower side, has two surfaces which are approximately parallel to one another whose length and width dimension represents the greatest dimension of the pigment or support material. The separation between the said surfaces, which represents the thickness of the flake, has, by contrast, a smaller dimension.

The interference pigments employed in accordance with the invention preferably have a flake-form support which comprises atleast one coating comprising a metal oxide, metal oxide hydrate or mixtures thereof.

The flake-form, transparent, colourless support preferably consists of natural or synthetic mica, kaolin or another phyllosilicate, of glass, calcium aluminium borosilicate, $SiO_2$, $TiO_2$ or $Al_2O_3$.

Particular preference is given to flake-form supports comprising mica, glass, calcium aluminium borosilicate or $SiO_2$, but in particular flake-form supports comprising natural or synthetic mica.

A coating applied to the support preferably consists of a metal oxide, a metal oxide hydrate or a mixture thereof. If a plurality of layers are present on the substrate, each of these layers is preferably likewise composed of a metal oxide, a metal oxide hydrate or a mixture thereof. The material for the individual layers is selected here in such a way that they differ from one another in their respective refractive index, which applies, in particular, to layers arranged directly on one another or to the material of the support and of the first layer located thereon. Preferred colourless metal oxides are selected from $TiO_2$, $SnO_2$, $SiO_2$, $Al_2O_3$, $ZrO_2$ and $ZnO$. In particular, colourless metal oxide layers consist of $TiO_2$, $SnO_2$ or $SiO_2$ and very particularly preferably of $TiO_2$ and $SnO_2$. Preference is also given to the oxide hydrates of the elements Ti, Sn, Si, Al, Zr and Zn, in particular those of Ti, Sn and Si, as well as in each case mixtures thereof with the corresponding metal oxides. Oxides and oxide hydrates of Ti and Sn may be present in a single layer or in layers separated from one another on the flake-form support.

The above-mentioned material combinations are preferably employed with flake-form support materials comprising mica, glass, calcium aluminium borosilicate or $SiO_2$, but in particular with flake-form supports comprising natural or synthetic mica.

Especial preference is given in accordance with the invention to the use of interference pigments which are based on synthetic or natural mica flakes and comprise only metal oxides and/or metal oxide hydrates of Ti and Sn in their coating. Since tin oxide, as is generally known, indicates rutilisation of titanium dioxide, titanium dioxide in such layer systems is predominantly present in the rutile modification.

The red, blue and green interference pigments employed in accordance with the invention may be built up here from in each case the same materials and differ merely in the layer thickness of the layers in the coating, giving the various interference colours. A structure of this type, which is the same in terms of material, of the red, blue and green interference pigments employed in accordance with the invention is also preferred. However, it is of course also possible to employ interference pigments which exhibit a different structure in terms of material from interference colour to interference colour, but otherwise satisfy the colouristic parameters of the present invention.

For a high-quality printed image as the result of the printing process according to the invention, it is of major importance that high area coverage of the print area units by means of the interference pigments takes place if these print area units are printed with the individual coloured printing inks. A parameter with the aid of which high area coverage can be established is the particle size of the interference pigments.

In accordance with the invention, the particle size of the red, green and blue interference pigments employed in accordance with the invention is in the range from 5 to 45 µm with a $d_{90}$ value of <40 µm, in particular of <35 µm. Preference is given to the use of interference pigments whose $d_{50}$ value is <20 µm, in particular <18 µm, and whose $d_{10}$ value is preferably <12 µm. The particle size here in each case relates to the principal axis of the pigments, i.e. the longest dimension of the respective pigment particle.

In order to obtain absolute values for the particle size which are based on a broad statistical evaluation, the particle size data in the present invention are based on an individual evaluation in the light microscope using automated image analysis. Since interference pigments have a flake form and can be oriented with their principal surface parallel to the light source, the actual particle surface area and the form factors can in each case be measured using this method. The number-weighted distribution of the principal axis length is expressed via the $d_{10}$, $d_{50}$, $d_{90}$ and optionally $d_{95}$ values (corresponds to the percentage of particles which are smaller than the value indicated). In each case, more than 1000 pigment particles are evaluated. The evaluation is carried out in accordance with [a] ISO 13322-1:2014—Particle size analysis-Image analysis methods-Part 1: Static image analysis methods; [b] ASTM E1617-09(2014) Standard Practice for reporting Particle size characterization data; or [c] Powder sampling and Particle size determination, T. Allen, Elsevier 2003.

The values obtained by means of this individual evaluation in the light microscope enable an extremely realistic overview of the particle sizes and the particle size distribution of flake-form pigments. However, other standard methods for determination of the particle size of interference pigments can also be employed.

The interference pigments employed in accordance with the invention generally have an aspect ratio (ratio of the average diameter to the average particle thickness) of 3:1 to 1000:1 and in particular of 6:1 to 250:1.

It can be seen from the values given above that the red, blue and green interference pigments employed in accordance with the invention have an extremely low proportion of coarse particles. In addition, it is particularly preferred if they also have a high average proportion of fine particles in which up to 40% of the pigment particles have a particle size in the range from 12 to 20 μm.

With interference pigments having these particle sizes and in particular this particle size distribution, high area coverage of the print area units can be achieved in accordance with the invention at the same time as good colouristic values (saturation, chroma).

Red, blue and green interference pigments which can be employed in the printing process according to the invention are interference pigments from various manufacturers, for example the commercially available interference pigments which are available from Merck KGaA under the names Iriodin®, Colorstream®, Xirallic®, Pyrisma®, Miraval®, Lustrepak®, Colorcrypt®, Colorcode® and Securalic®, furthermore pigments having the name Mearlin® and pigments from the Lumina®Royal series from BASF SE and also other commercially available interference pigments from other manufacturers. If these pigments meet the requirements described above with respect to colour angle, saturation, chroma and particle size, high-quality, multicoloured printed images, which, if desired, may have a photorealistic optical impression, can be obtained by means of the printing process according to the invention.

Interference pigments which are commercially available under the names Iriodin® and Pyrisma®, in particular the interference pigments of the Pyrisma® series, have proven particularly suitable.

However, the present inventors have, in addition, also found interference pigments which are particularly suitable for carrying out the printing process according to the invention and are therefore likewise a subject-matter of the present invention.

As already described above, the printing process according to the invention is based, in particular, on it being possible to form a yellow print area unit from a printing ink which comprises red interference pigments and from a printing ink which comprises green interference pigments by successive application of these printing inks to the same area unit. For this purpose, the red interference pigments and the green interference pigments that are present in the respective printing inks must be matched particularly well to one another.

The invention therefore relates to a red interference pigment and a green interference pigment which each consist of a flake-form transparent substrate and a coating located on the substrate, where the coating in each case consists of at least 85% by weight, based on the weight of the layer, of titanium dioxide and/or titanium dioxide hydrate and where the red interference pigment has a hue angle $h_{u'v'}$ in the CIELUV colour space system in the range from 0° to 10° and the green interference pigment has a hue angle $h_{u'v'}$ in the range from 100° to 130°, in each case determined in a separate, full-area coating comprising the respective coloured printing ink on a black substrate under the measurement condition 45°/as 25°.

The flake-form transparent substrate here is flakes comprising natural or synthetic mica, kaolin, sericite, talc or $SiO_2$. Particular preference is given to silicate substrates, in particular natural mica.

The coating located on the substrate and surrounding the substrate in each case consists of at least 85% by weight, based on the weight of the coating, of titanium dioxide and/or titanium dioxide hydrate. It may also consist of at least 90% by weight, 95% by weight or 100% weight of titanium dioxide and/or titanium dioxide hydrate. Titanium dioxide here can be both in the anatase and also in the rutile modification and is preferably in the rutile modification. Furthermore, the coating may comprise oxides and/or oxide hydrates of tin, silicon and/or aluminium in an amount of 0.01 to 15% by weight, preferably 0.5 to 10% by weight, in particular 0.5 to 5% by weight, based on the weight of the coating. Apart from the said ingredients, the coating preferably comprises no further ingredients.

The red interference pigment in accordance with the present invention additionally has a hue angle $h_{u'v'}$ in the CIELUV colour space system in the range from 0° to 10°, in particular from 1° to 7°, measured under the conditions described above. Furthermore, the red interference pigment has a saturation $S^*_{u'v'}$ of ≥0.65 and a chroma $C^*_{u'v'}$ of ≥33, preferably of >40.

The hue angle $h_{u'v'}$ is determined essentially by the thickness of the $TiO_2$-containing coating on the substrate. The geometrical layer thickness of this coating in the red interference pigment according to the invention is therefore in the range from 70 to 110 nm.

The green interference pigment in accordance with the present invention has a hue angle $h_{u'v'}$ in the CIELUV colour space system in the range from 100° to 130°, in particular from 110° to 120°, measured under the conditions described above. Furthermore, the green interference pigment has a saturation $S^*_{u'v'}$ of ≥0.45 and a chroma $C^*_{u'v'}$ of ≥30, preferably of >30.

The geometrical layer thickness of the $TiO_2$-containing coating in the green interference pigment according to the invention is in the range from 160 to 200 nm.

The determination of the geometrical layer thickness of the $TiO_2$-containing coating in the case of the interference pigments according to the invention can in the simplest case be carried out by measurement of suitable electron microscopy section images. In order to achieve reliable values, in each case at least 100 section images are evaluated and the results are averaged.

In order to be able to achieve high area coverage by the interference pigments according to the invention in the printing process according to the invention, the particle size and the particle size distribution of the interference pigments also plays a crucial role, as already described above. The particle size for the red and green interference pigments according to the invention is therefore in the range from 5 to 30 µm, at a $d_{95}$ value of <25 µm, a $d_{50}$ value of <15 µm and preferably at a $d_{10}$ value of <10 µm. It goes without saying that the said particle sizes of the red and green interference pigments according to the invention require that substrates in the corresponding dimensions are employed in their preparation.

The preparation of the red and green interference pigments according to the invention can be carried out by conventional processes for the preparation of interference pigments, as have been known per se for some time.

A wet-chemical process with inorganic starting materials is preferably employed here. The covering of the flake-form substrate with a $TiO_2$-containing coating is carried out here in a temperature-controlled aqueous dispersion of the substrate particles with addition of at least one solution of an inorganic titanium salt, where the suspension is adjusted to and kept constant at a pH at which titanium oxide hydrate precipitates onto the substrate flakes. At a separate time or together with the solution of the inorganic salt, small amounts of a solution of an inorganic tin salt, of an inorganic silicon salt and/or a solution of an inorganic aluminium salt may additionally also be added to the suspension. The addition of the titanium salt solution is terminated as soon as the desired colour end point has been reached. In order to complete the precipitation reaction, the mixture is generally subsequently stirred a little and the pigment obtained is then separated off, washed and subjected to further work-up. The isolated solid is preferably dried and subsequently calcined at a temperature of greater than 500° C. The calcination converts the titanium oxide hydrate completely or virtually completely into titanium dioxide.

In the printing process according to the invention, the red, blue and green printing inks each consist of a printing ink vehicle and the corresponding red, blue or green interference pigments whose structure and properties have already been described above.

In particular, a red printing ink according to the invention consists of a printing ink vehicle which is colour-pigmented exclusively with a red interference pigment, where the red interference pigment is essentially an interference pigment which consists of a flake-form transparent substrate and a coating located on the substrate, where the coating in each case consists of at least 85% by weight, based on the weight of the layer, of titanium dioxide and/or titanium dioxide hydrate and the interference pigment has a hue angle $h_{u'v'}$ in the CIELUV colour space system in the range from 0° to 10°.

By contrast, a green printing ink in accordance with the present invention consists of a printing ink vehicle which is colour-pigmented exclusively with a green interference pigment, where the green interference pigment is essentially an interference pigment which consists of a flake-form transparent substrate and a coating located on the substrate, where the coating in each case consists of at least 85% by weight, based on the weight of the layer, of titanium dioxide and/or titanium dioxide hydrate and the interference pigment has a hue angle $h_{u'v'}$ in the CIELUV colour space system in the range from 100° to 130°.

In accordance with the invention, "essentially" here means that the red and green printing inks in each case comprise the red or green interference pigment according to the invention in a proportion of >50% by weight, preferably from 75 to 100% weight, based on the content of red or green interference pigment in the respective printing ink.

All other statements made above in relation to the red and green interference pigment that is in each case present in the corresponding printing ink and the statements with respect to measurement conditions for the determination of the colorimetric parameters likewise apply with respect to the printing inks according to the invention.

Printing ink vehicles that can be employed are commercially available or generally conventional printing ink vehicles which comprise at least one binder or binder system and frequently also solvents provided that they are not radiation-curing binder systems.

Binders which can be used are the binders or binder systems usually employed for printing processes, for example aqueous or solvent-containing binders based on nitrocellulose, based on polyamide, based on acrylate, based on polyvinylbutyral, based on PVC, based on PUR or suitable mixtures thereof. For the success of the printing process according to the invention, it is important that the corresponding binders or binder systems cure in a transparent and colourless manner in order not to hinder or falsify the optical effect of the interference pigments.

Besides water, it is also possible to employ organic solvents, for example branched or unbranched alcohols, aromatic compounds or alkyl esters, such as ethanol, 1-methoxypropanol, 1-ethoxy-2-propanol, ethyl acetate, butyl acetate, toluene or mixtures comprising these. The respective coloured printing ink may, however, also have a low solvent content or be entirely free from solvents if radiation-curing binder systems, such as, for example, UV-curing binder systems, are used.

Besides the binder or binder system and where appropriate the solvent or solvents, the printing ink vehicle may, in addition to the respective interference pigments, also comprise various assistants and/or additives.

Suitable additives are UV stabilisers, inhibitors, flame-proofing agents, lubricants, dispersants, redispersants, anti-foams, flow-control agents, film formers, adhesion promoters, drying accelerators, drying retardants, photoinitiators, etc. The respective printing ink vehicle preferably comprises all necessary assistants in liquid form in order that the optical effect of the interference pigments is not weakened or otherwise impaired by additional solids. For this reason, it is preferred that neither (soluble) dyes nor other colouring pigments or solid fillers apart from the red, blue or green interference pigments necessary in accordance with the invention are present in the finished coloured printing inks.

The red, blue and green interference pigments described above are in each case present individually or as a mixture of two or more in the coloured printing inks employed in accordance with the invention. This means that, for example, a red printing ink either comprises only a single type of red interference pigments or alternatively may also comprise a plurality of different red interference pigments (a plurality of types), which can have a layer structure which is formally the same, similar or different on the same support material or also on different support materials, but which, as a mixture, satisfy the requirements described above with respect to the colour angle $h_{u'v'}$ and preferably also with respect to the saturation value $S^*_{u'v'}$. The requirements of the chroma value $C^*_{u'v'}$ should, if appropriate, also be satisfied. So long as the said conditions are complied with and the interference pigments employed have, as particles, high transparency and are preferably colourless, the process according to the invention can be carried out successfully.

The combination described of the interference pigments in the respective coloured printing ink naturally also applies to the blue or green printing ink in the same way as for the red printing ink described above.

However, the red and green interference pigments employed are particularly preferably the red and green interference pigments according to the invention that are described above. These may advantageously be employed as individual pigments, i.e. without blending with other interference pigments of the same colour, in the respective printing ink and result in high-quality print results in photographic quality.

The proportion by weight of the red, blue or green interference pigments in the respective red, blue or green printing ink is generally between 1 and 40 percent by weight and preferably between 5 and 35 percent by weight, in particular between 10 and 30 percent by weight, based on the total weight of the respective printing ink. It goes without saying here that the pigment concentration is selected in each case in such a way that the printing process according to the invention can be carried out without problems with the apparatuses available in each case. In addition, the pigment concentration in the printing ink is selected, depending on the printing apparatus employed, in such a way that the highest possible, processable pigment proportion is preferably selected in order to be able to obtain the requisite area coverage of the print area units to be printed. If necessary, the pigment concentration in the red, blue and green printing ink can be selected differently from one another, but is preferably also the same pigment concentration in each of the three printing inks if the same printing apparatuses are used for each printing step.

In the printing process according to the invention, a red printing ink, a blue printing ink and a green printing ink, each of which are colour-pigmented with red, blue or green interference pigments, are applied successively in the form of print area units to a substrate and solidified. A print area unit here is composed of a printed layer of one printing ink or a plurality of printed layers of two or three printing inks. Each of the individual coloured printed layers can be solidified separately or the two or three printed layers on a print area unit can be applied successively and solidified jointly in a single process step.

In accordance with the invention, the substrate can be virtually any substrates which can be printed using usual printing processes, i.e. paper of a wide variety of compositions, cardboard, wallpapers, plastic films, plastic bodies, metal foils, metal bodies, textiles, glass in various forms, wood or composite materials which comprise at least one of the materials mentioned above. The substrates should preferably have an opaque surface on which the printing process according to the invention is carried out.

The substrates may have primer or satinisation layers. Conventional primer or satinisation layers, in particular on papers or cardboards, often have a pale or white colour. Although substrates pre-coated in this way are in principle suitable as substrates for use in the printing process according to the invention, the optical effects that can be achieved therewith in the resultant printed product are, however, only very subtle and are not particularly clearly perceptible and have similarity with photographic negatives.

The substrates therefore preferably have a black, dark or coloured surface. This colouration of the substrate can be obtained, depending on the substrate material employed and the intended application of the finished product, either by mass colouring of the substrate material, for example in the case of plastic films, or by means of coating of the substrate with a black, dark or coloured coating. The latter can be applied in addition or as an alternative to primer or satinisation layers. A dark coating is taken to mean, for example, grey, brown, blue, red, violet or green coatings which only have low lightness with $L^*$ values (CIELUV) in the range from 0 to 20, i.e. are generally referred to as dark grey, dark brown, dark blue, dark red, dark violet or dark green. They can be obtained, in exactly the same way as coloured coatings, by the addition of conventional colourants to corresponding coating compositions, optionally in combination with carbon black or other black colourants. The entire substrate surface to be printed is preferably provided with a black, dark or, alternatively, coloured coating of this type. However, it should be noted that a coloured substrate which has a surface to be printed that is neither black nor dark grey considerably influences the colouration of the final printed product after the printing process according to the invention is complete. If the finished printed image is to be a multicoloured printed image with a photorealistic optical effect, the use of black or at least dark grey surfaces of substrates is therefore indicated.

The colour design of the achievable printed image is also affected by the sequence of application of the individual coloured printing inks. Thus, it is particularly preferred in accordance with the invention if the sequence of the printing inks to be applied to the substrate is as follows:

first printed layer: red printing ink comprising red interference pigments,
second printed layer: green printing ink comprising green interference pigments and
third printed layer: blue printing ink comprising blue interference pigments (sequence RGB).

Although any other printing sequence can likewise be employed, colour deviations in the resultant printed images where the colour applied last is more clearly perceptible than the underlying colours can, however, then be expected. This may be entirely advantageous, depending on the desired optical result, but is not preferred for the achievement of photorealistic effects.

In order to emphasise or intensify white areas or brightness reflections in the resultant printed images, it is in addition advantageous if, in addition to the red, blue and green printing ink, a further printing ink which is pigmented with white interference pigments and comprises no further colouring pigments or dyes is also applied to the substrate in a fourth printing step. In colour theory, white, just like black, is not regarded as a colour. The printing ink pigmented with white interference pigments, which is called a white printing ink here, is therefore likewise not a coloured printing ink. In order to produce multicoloured printed images having a colour spectrum over the entire colour circle, the application of this white printing ink is not necessary, since white colour areas can basically also be produced by printing the red, green and blue printing inks one on top of the other. However, the use of the white printing ink increases the brightness of the resultant printed images and simplifies the printing process overall, since fine tuning of the printing inks with one another is simplified.

The white printing ink is preferably applied after the application of the red, green and blue printing inks. The interference pigments employed in the white printing ink are subject to the single restriction that their particle size must be printable with the printing plate selected.

Otherwise, virtually any of the known white interference pigments, which are available in large number, can be employed. The white interference pigments are preferably also completely transparent as individual particles and comprise no absorbent layers or substrates.

In the printing process according to the invention, the three coloured printing inks are applied in the form of print area units to the substrate to be printed, where the print area units printed in each case with the individual coloured printing inks are arranged alongside one another or completely or partly on top of one another, i.e. overlapping. Only in the case of fully or partly overlapping print area units for the individual printing inks do mixed colours formed from the red, blue and green interference pigments in different composition arise in the resultant printed image.

Depending on the printing plate employed, print area units are taken to mean print dots or also print areas, which can adopt various sizes and shapes, depending on whether the printing process is a screen printing process or a printing process in which larger area units can be printed directly.

The printing process according to the invention can generally be applied to a very wide variety of standard printing processes and can therefore also be carried out using conventional printing tools. Thus, it can be carried out as a conventional analogue printing process, such as, for example, as a planographic printing process, a gravure printing process, a relief printing process or a screen printing process, or as a digital printing process.

Planographic printing processes are taken to mean, in particular, conventional or UV-curing offset printing processes or also dry offset printing processes, which are carried out without fountain solution. Gravure printing processes which may be mentioned are, for example gravure packaging printing, gravure illustration printing, gravure decorative printing or also intaglio printing processes (recess printing). Relief printing processes are taken to mean a letterpress printing process, an indirect relief printing process, such as letterset printing, or the frequently used flexographic printing process. A known screen printing process is silk-screen printing. Known digital processes are ink-jet printing, the toner-based electrophotography process or thermal transfer printing.

All these standard printing processes usually operate in four-colour printing in accordance with CMYK colour separation. The printing process according to the invention can instead now be applied to all said printing processes in such a way that, instead of the cyan-, magenta-, yellow- and black-pigmented printing inks usually employed, the red, blue, green and optionally white printing inks pigmented exclusively with interference pigments are now printed successively.

These arise in the various colour combinations, namely likewise a yellow, cyan-coloured or magenta-coloured printed image, more precisely in the combinations red/green - - - yellow, green/blue - - - cyan and blue/red - - - magenta.

Each of the printing processes described above allows in each case a maximum layer thickness of the resultant dry printed layer in a single print operation. This is very different from printing process to printing process. Correspondingly, the layer thicknesses of the individual printed layers in the printing process according to the invention are 0.2 to 250 μm. However, it is conceivable that, in the case of very small layer thicknesses of the individual printed layer, only very a small amount of pigments is applied to the respective print area unit. In these cases, in order to establish high area coverage with the respective interference pigments, the printing step with which an individual coloured printing ink is transferred onto the substrate can therefore optionally be repeated one or more times. The printed layer thicknesses (dry layer thicknesses) for the individual printing inks are therefore preferably in the range from 0.4 to 80 μm, particularly preferably in the range from 0.6 to 10 μm and in particular in the range from 1.0 to 5.0 μm.

High area coverage of the individual print area units with the interference pigments employed in accordance with the invention may additionally also be favoured by the choice of printing tools, for example by the line count of the print rolls and/or the scoop volume of the cells on the printing plates. However, such measures are part of the expert knowledge of the average person skilled in the art and accordingly do not have to be explained in greater detail here.

The printing process according to the invention is preferably carried out in such a way that each of the various printing inks is applied with the aid of the same printing process in each case, i.e. by means of printing tools of the same type. Although it is in principle possible to employ different printing tools for each of the different printing steps, this would, however, make the printing process unnecessarily complicated and expensive.

The printing process according to the invention can be adapted to most conventional analogue and digital printing processes and can therefore be carried out using conventional printing tools. With only three coloured printing inks which are colour-pigmented exclusively with interference pigments, multicoloured printed images which are able to cover a colour range over the entire available colour space can be produced in RGB mode. The printed images obtained can have photorealistic effects and at the same time, depending on the type of interference pigments used, have high lustre and/or glitter effects with a depth effect which differ significantly in their optical appearance from conventional glossy photographic prints, due to the particle character of the interference pigments. In addition, the printing process according to the invention can also be combined with conventional printing processes in CMYK mode, so that certain surface or print motif parts can be printed in conventional CMYK colour separation mode and parts thereof or other surface or print motif parts which are different therefrom can be printed in RGB mode according to the invention on one and the same substrate. For the colour design of surfaces in printing processes, novel possibilities and effects which were not achievable to date are therefore available. In addition, the printing process according to the invention will in the future allow the colour space that is accessible via printing processes to be significantly broadened, in particular in respect of hue variety and colour saturation, since the restrictions in this respect due to the conventional CMYK printing process cease to apply and interference pigments in the interference colours red, green and blue also allow significant improvements in relation to saturation and chroma.

The present invention also relates to a printed product produced by the process described above which represents a multicoloured printed image on a substrate. The printed product according to the invention contains a multicoloured printed image which can have hues in the entire colour space that is accessible by printing processes and, due to the exclusive use of interference pigments, can have extraordinarily attractive lustre and/or glitter effects, in addition to impressive depth and brightness of the printed colour areas. In addition, it is possible to achieve photorealistic print effects which are very similar to photographs, but additionally have a deep lustre which is not obtainable using conventional photograph printing processes and differs impressively from glossy photographic prints in optical terms. Motif details in the printed image can be depicted sharply. It goes without saying that the choice of motif for the printed image obtained in accordance with the invention is limited merely by the choice of printing tools, but in no other way.

In addition, the present invention also relates to the use of the printed products described above in decorative and artistic products. The above-described optical properties of the printed products according to the invention predestine their use in decorative products of all types which either themselves consist of the printed products according to the invention, such as, for example, advertising and job printing, or contain these, such as, for example, packaging for a very wide variety of products and in very different designs. Since the printed products in accordance with the present invention have optical properties which were not obtainable to date in printing processes, they are also suitable for use in the artistic sector, for example for photo similar products, collages, calendars, textile coatings and many more.

The printed products produced in accordance with the invention have attractive optical properties which were not previously available on the market in this way and therefore make a valuable contribution to broadening the range of decorative and artistic products.

EXAMPLE 1

Screen Printing Process

A red, a green and a blue printing ink comprising a commercially available printing ink vehicle for screen printing is prepared by establishing a pigment concentration of 15% by weight in each case by addition of the pigments Pyrisma® T30-21 Red, Pyrisma® T30-24 Green and Pyrisma® T30-23 Blue. For the preparation of a fourth printing ink, the same printing vehicle is mixed intimately with 15% by weight of the white interference pigment Iriodin® 6123 Icy White Satin.

A motif separated into the red-green-blue printing inks is printed successively in this sequence onto black-coloured cardboard (Fedrigoni SPX Black) using a conventional screen (40 L/cm, 80 PW, mesh width 166 µm) and the white area units are subsequently intensified by means of the white printing ink.

A sharply delimited printed image of photographic quality in the desired multicoloured design which has strong pearlescence is obtained.

EXAMPLE 2

Gravure Printing Process

A red, a green and a blue printing ink comprising a commercially available printing ink vehicle for gravure printing (Siegwerk 5036 Verschnitt NC TOF) are prepared by establishing a pigment concentration of 25% by weight in each case by addition of the pigments Pyrisma® T30-21 Red, Pyrisma® T30-24 Green and Pyrisma® T30-23 Blue. For the preparation of a fourth printing ink, the same printing vehicle is mixed intimately with 25% by weight of the white interference pigment Iriodin® 6123 Icy White Satin.

A motif separated into the red-green-blue printing inks is printed successively in this sequence onto black-coloured cardboard (Fedrigoni SPX Black) using a gravure printing cylinder (40 L/cm, cell depth 45 µm, laser engraving) in the gravure printing process, and the white area units are subsequently intensified by means of the white printing ink.

A sharply delimited printed image of photographic quality in the desired multicoloured design which, besides strong pearlescence, has great optical depth and virtual three-dimensionality is obtained.

EXAMPLE 3

Preparation of a Red Interference Pigment 70 g of natural mica having a particle size of 5-25 µm ($d_{50}$=12 µm) are suspended in 1.4 l of deionised water, and the suspension is warmed to 75° C. with vigorous stirring. A solution of 3 g of $SnCl_4 \times 5H_2O$ in 70 g of water is slowly metered into the suspension at pH=2.0. The pH is kept constant at 2.0 using 32% sodium hydroxide solution. The pH is then lowered to 1.8, and about 750 g of a 32% $TiCl_4$ solution are slowly metered in at this pH. During this addition, the pH is kept constant using 32% sodium hydroxide solution. The addition of the $TiCl_4$ solution is terminated when the desired colour end point has been reached. The mixture is subsequently stirred for a further hour, and the coated mica pigment is then filtered off, washed and dried at 110° C. for 15 h. Finally, the pigment is calcined at 850° C. for 1 h.

An interference pigment having an intense red interference colour is obtained which has a hue angle $h_{u'v'}$ of 4.2°. The chroma value $C^*_{u'v'}$, likewise determined in the CIE-LUV colour space system (under the conditions described above), is 42.0 and the saturation value $S^*_{u'v'}$ is 0.69. The $TiO_2$-containing coating on the mica substrate consists of more than 98% by weight of $TiO_2$ in the rutile modification and has a geometrical layer thickness of about 85 nm.

EXAMPLE 4

Preparation of a Green Interference Pigment 70 g of natural mica having a particle size of 5-25 µm ($d_{50}$=12 µm) are suspended in 1.4 l of deionised water, and the suspension is warmed to 75° C. with vigorous stirring. A solution of 3 g of $SnCl_4 \times 5H_2O$ in 70 g of water is slowly metered into the suspension at pH=2.0. The pH is kept constant at 2.0 using 32% sodium hydroxide solution. The pH is then lowered to 1.8, and about 1200 g of a 32% $TiCl_4$ solution are slowly metered in at this pH. During this addition, the pH is kept constant using 32% sodium hydroxide solution. The addition of the $TiCl_4$ solution is terminated when the desired colour end point has been reached. The mixture is subsequently stirred for a further hour, and the coated mica pigment is then filtered off, washed and dried at 110° C. for 15 h. Finally, the pigment is calcined at 850° C. for 1 h. An interference pigment having an intense green interference colour which has a slight yellow tinge is obtained which has a hue angle $h_{u'v'}$ of 118°. The chroma value $C^*_{u'v'}$, likewise determined in the CIELUV colour space system (under the conditions described above), is 32.0 and the saturation value $S^*_{u'v'}$ is 0.50.

The TiO$_2$-containing coating on the mica substrate consists of more than 98% by weight of TiO$_2$ in the rutile modification and has a geometrical layer thickness of about 180 nm.

EXAMPLE 5

Gravure Printing Process

A red, a green and a blue printing ink comprising a commercially available printing ink vehicle for gravure printing (Siegwerk 5036 Verschnitt NC TOF) are prepared by establishing a pigment concentration of 25% by weight in each case by addition of the red interference pigment from Example 3, the green interference pigment from Example 4 and Pyrisma® T30-23 Blue.

A motif separated into the red-green-blue printing inks is printed successively in this sequence onto black-coloured cardboard (Fedrigoni SPX Black) using a gravure printing cylinder (40 L/cm, cell depth 45 μm, laser engraving) in the gravure printing process. No subsequent intensification of white area units by means of a white printing ink is carried out. A sharply delimited printed image of photographic quality in the desired multicoloured design which has strong pearlescence, great optical depth and virtual three-dimensionality is obtained. The white area units exhibit a silver-white lustre and yellow area units appear in saturated, lustrous colouration

The invention claimed is:

1. A process for printing multicoloured printed images in RGB mode on a substrate, which comprises applying successively and solidifying three different colored printing inks in the form of print area units to the substrate,
   wherein the three different colored printing inks each consist of a printing ink vehicle which is color-pigmented exclusively with interference pigments and one printing ink comprises one or more red interference pigments, one printing ink comprises one or more green interference pigments and one printing ink comprises one or more blue interference pigments,
   wherein the print area units lie alongside one another and/or one on top of the other such that a multicolored overall printed image is formed from the three different colored printing inks, and
   wherein a yellow print area unit is formed by successive application of the colored printing ink which comprises one or more red interference pigments and the colored printing ink which comprises one or more green interference pigments on top of each other, where the one or more red interference pigments have a hue angle, $h_{u'v'}$, in the CIELUV color space system in the range from 0° to 25° and the one or more green interference pigments have a hue angle, $h_{u'v'}$, in the range from 100° to 180°, the hue angle in each case having been determined in a separate, full-area coating of the respective colored printing ink on a black substrate under a measurement condition of 45°/as 25° with a multiangle color spectrophotometer for the 2° or 10° standard observer and D65 light source.

2. The process according to claim 1, wherein the hue angle, $h_{u'v'}$, of the one or more red interference pigments has a separation from the hue angle, $h_{u'v'}$, of the one or more green interference pigments in the range from 90 to 160 angle degrees.

3. The process according to claim 1, wherein the one or more blue interference pigments have a hue angle, $h_{u'v'}$, in the CIELUV colour space system in the range from 210° to 280°, determined in a separate, full-area coating comprising the blue printing ink on a black substrate under the measurement condition 45°/as 25° with a multiangle color spectrophotometer for the 2° or 10° standard observer and D65 light source, where the separation of the hue angle $h_{u'v'}$ of the one or more green interference pigments from the hue angle, $h_{u'v'}$, of the one or more blue interference pigments and the separation of the hue angle, $h_{u'v'}$, of the one or more blue interference pigments from the hue angle, $h_{u'v'}$, of the one or more red interference pigments is in each case in the range from 90 to 160 angle degrees.

4. The process according to claim 1, wherein the interference pigments have the following saturation values in an in each case separate, full-area coating comprising the respective coloured printing ink on a black substrate in the CIELUV color space system under the measurement condition 45°/as 25° with a multiangle color spectrophotometer for the 2° or 10° standard observer and D65 light source:
   red interference pigments $S^*_{u'v'} \geq 0.6$,
   blue interference pigments $S^*_{u'v'} \geq 1.2$ and
   green interference pigments $S^*_{u'v'} \geq 0.4$.

5. The process according to claim 1, wherein the interference pigments have the following chroma values in an in each case separate, full-area coating comprising the respective coloured printing ink on a black substrate in the CIELUV colour space system under the measurement condition 45°/as 25° with a multiangle color spectrophotometer for the 2° or 10° standard observer and D65 light source:
   red interference pigments $C^*_{u'v'} \geq 30$,
   blue interference pigments $C^*_{u'v'} \geq 50$ and
   green interference pigments $C^*_{u'v'} \geq 25$.

6. The process according to claim 1, wherein the red, blue and green interference pigments each consist of transparent, colorless, flake-form supports which have been coated with one or more layers of transparent, colorless materials.

7. The process according to claim 1, wherein the red, blue and green interference pigments have a particle size in the range from 5 to 45 μm and a $d_{90}$ value of <40 μm.

8. The process according to claim 1, wherein the printing inks are applied to the substrate in the sequence red-green-blue.

9. The process according to claim 1, wherein, in addition to the colored printing inks, a printing ink which has been pigmented with white interference pigments and comprises no further coloring pigments or dyes is applied to the substrate.

10. The process according to claim 1, wherein the substrate to which the three different colored printing inks are applied is a paper, a cardboard, a wallpaper, a plastic film, a plastic body, a metal foil, a metal body, a textile, a glass or a wood material or a composite material which comprises at least one of these said materials.

11. The process according to claim 10, wherein the substrate has a black surface or a colored surface which has an L* value (CIELUV) in the range from 0 to 20.

12. The process according to claim 1, which is a planographic printing process, a gravure printing process, a relief printing process, a screen printing process or a digital printing process.

13. The process according to claim 1, wherein each of the printing inks is applied with a dry layer thickness in the range from 0.2 to 250 μm.

14. A printed product produced by a process according to claim 1.

15. A decorative or artistic product which has been printed according to the process of claim 1.

16. A red interference pigment consisting of a flake-form transparent substrate and a coating located on the substrate, where the coating consists of at least 85% by weight, based on the weight of the coating, of titanium dioxide and/or titanium dioxide hydrate and where the red interference pigment has a hue angle, $h_{u'v'}$, in the CIELUV color space system in the range from 0° to 10°, determined in a separate, full-area coating comprising a red printing ink which has been color-pigmented exclusively with the red interference pigment, on a black substrate under the measurement condition 45°/as 25° with a multiangle color spectrophotometer for the 2° or 10° standard observer and D65 light source.

17. A green interference pigment consisting of a flake-form transparent substrate and a coating located on the substrate, where the coating consists of at least 85% by weight, based on the weight of the coating, of titanium dioxide and/or titanium dioxide hydrate and where the green interference pigment has a hue angle, $h_{u'v'}$, in the CIELUV color space system in the range from 100° to 130°, determined in a separate, full-area coating comprising a green printing ink which has been color-pigmented exclusively with the green interference pigment, on a black substrate under the measurement condition 45°/as 25° with a multiangle color spectrophotometer for the 2° or 10° standard observer and D65 light source.

18. A printing ink consisting of a printing ink vehicle which has been color-pigmented exclusively with one or more red interference pigments, where the red interference pigments are essentially red interference pigments according to claim 16.

19. A printing ink consisting of a printing ink vehicle which has been color-pigmented exclusively with one or more green interference pigments, where the green interference pigments are essentially green interference pigments according to claim 17.

20. A process according to claim 1, wherein:
the printing ink having one or more red interference pigments comprises a red interference pigment consisting of a flake-form transparent substrate and a coating located on the substrate, where the coating consists of at least 85% by weight, based on the weight of the coating, of titanium dioxide and/or titanium dioxide hydrate and where the red interference pigment has a hue angle, $h_{u'v'}$, in the CIELUV color space system in the range from 0° to 10°, determined in a separate, full-area coating comprising a red printing ink which has been color-pigmented exclusively with the red interference pigment, on a black substrate under the measurement condition 45°/as 25° with a multiangle color spectrophotometer for the 2° or 10° standard observer and D65 light source and a printing ink vehicle, and the printing ink having one or more green interference pigments comprises a green interference pigment consisting of a flake-form transparent substrate and a coating located on the substrate, where the coating consists of at least 85% by weight, based on the weight of the coating, of titanium dioxide and/or titanium dioxide hydrate and where the green interference pigment has a hue angle, $h_{u'v'}$, in the CIELUV color space system in the range from 100° to 130°, determined in a separate, full-area coating comprising a green printing ink which has been color-pigmented exclusively with the green interference pigment, on a black substrate under the measurement condition 45°/as 25° with a multiangle color spectrophotometer for the 2° or 10° standard observer and D65 light source and a printing ink vehicle.

* * * * *